(12) United States Patent
Delker et al.

(10) Patent No.: US 8,972,592 B1
(45) Date of Patent: Mar. 3, 2015

(54) EXTENDING AN INTERFACE PACK TO A COMPUTER SYSTEM

(75) Inventors: Jason R. Delker, Olathe, KS (US); Michael P. McMullen, Leawood, KS (US); M. Jeffrey Stone, Overland Park, KS (US); Peter S. Syromiatnikov, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 65 days.

(21) Appl. No.: 13/118,058

(22) Filed: May 27, 2011

(51) Int. Cl.
- *G06F 15/16* (2006.01)
- *H04L 12/24* (2006.01)
- *H04L 12/26* (2006.01)
- *G06F 3/048* (2013.01)
- *H04L 12/70* (2013.01)

(52) U.S. Cl.
CPC ........ *H04L 12/2458* (2013.01); *H04L 12/2621* (2013.01); *H04L 41/22* (2013.01); *G06F 3/048* (2013.01); *H04L 2012/5614* (2013.01)
USPC ........................................ 709/229

(58) Field of Classification Search
CPC ............... H04I 12/2458; H04I 12/2621; H04I 2012/5614; H04I 41/22; G06F 3/048
USPC ................. 715/700; 709/229; 455/343.3, 41.1
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,622,016 B1 | 9/2003 | Sladek et al. | |
| 6,647,260 B2 | 11/2003 | Dusse et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |
| 7,260,386 B1 | 8/2007 | Haldar et al. | |
| 7,500,198 B2 | 3/2009 | Mathews et al. | |
| 7,558,953 B2 | 7/2009 | Osthoff et al. | |
| 7,702,322 B1 | 4/2010 | Maurya et al. | |
| 7,930,636 B2 * | 4/2011 | Garbow et al. | ............... 715/713 |
| 7,970,386 B2 | 6/2011 | Bhat et al. | |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

First Action Interview Pre-Interview Communication dated Apr. 24, 2012, U.S. Appl. No. 12/876,220, filed Sep. 6, 2010.

(Continued)

*Primary Examiner* — Mohamed Wasel
*Assistant Examiner* — Tsung Wu

(57) ABSTRACT

A method of extending an ID to a computer system comprises detecting, by a mobile communication device operating an ID, a computer system, wherein the IDs comprise an auto-installation routine and at least one of an application, a media file, and a widget; establishing a communication link between the mobile communication device and the computer system; and loading and activating the ID on the computer system.

17 Claims, 6 Drawing Sheets

(56) References Cited

U.S. PATENT DOCUMENTS

| | | | |
|---|---|---|---|
| 8,012,219 B2 | 9/2011 | Mendez et al. | |
| 8,150,962 B1 | 4/2012 | Wolter | |
| 8,244,277 B1 | 8/2012 | Cha et al. | |
| 8,265,658 B2 | 9/2012 | Issa et al. | |
| 8,270,310 B2 | 9/2012 | Raleigh | |
| 8,270,941 B2 | 9/2012 | Kenagy et al. | |
| 8,315,198 B2* | 11/2012 | Corneille et al. | 370/313 |
| 8,359,016 B2 | 1/2013 | Lindeman et al. | |
| 8,533,605 B1 | 9/2013 | Cha et al. | |
| 8,538,398 B2 | 9/2013 | Wilson et al. | |
| 8,559,933 B1* | 10/2013 | Delker et al. | 455/418 |
| 8,577,334 B1 | 11/2013 | Smith et al. | |
| 8,583,091 B1 | 11/2013 | Delker et al. | |
| 8,589,911 B1 | 11/2013 | Sharkey et al. | |
| 8,838,087 B1 | 9/2014 | Delker et al. | |
| 8,843,122 B1 | 9/2014 | Wick et al. | |
| 2002/0029169 A1 | 3/2002 | Oki et al. | |
| 2002/0054086 A1 | 5/2002 | Van Oostenbrugge et al. | |
| 2002/0054150 A1 | 5/2002 | l'Anson et al. | |
| 2002/0101444 A1 | 8/2002 | Novak et al. | |
| 2002/0123335 A1 | 9/2002 | Luna et al. | |
| 2002/0142760 A1 | 10/2002 | Gidron et al. | |
| 2002/0167542 A1 | 11/2002 | Florin | |
| 2003/0233329 A1 | 12/2003 | Laraki et al. | |
| 2004/0044752 A1 | 3/2004 | Hamaguchi et al. | |
| 2004/0171375 A1 | 9/2004 | Chow-Toun | |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1 | 10/2004 | Mathews et al. | |
| 2005/0050474 A1 | 3/2005 | Bells et al. | |
| 2005/0071780 A1 | 3/2005 | Muller et al. | |
| 2005/0085272 A1 | 4/2005 | Anderson et al. | |
| 2006/0048141 A1 | 3/2006 | Persson et al. | |
| 2006/0085751 A1 | 4/2006 | O'Brien et al. | |
| 2006/0092861 A1 | 5/2006 | Corday et al. | |
| 2006/0190569 A1 | 8/2006 | Neil et al. | |
| 2006/0258289 A1* | 11/2006 | Dua | 455/41.3 |
| 2006/0277469 A1* | 12/2006 | Chaudhri et al. | 715/709 |
| 2007/0067738 A1 | 3/2007 | Flynt et al. | |
| 2007/0088851 A1 | 4/2007 | Levkovitz et al. | |
| 2007/0109580 A1 | 5/2007 | Yoshida | |
| 2007/0130156 A1 | 6/2007 | Tenhunen et al. | |
| 2007/0265023 A1 | 11/2007 | Bengtsson et al. | |
| 2007/0268842 A1 | 11/2007 | Wang | |
| 2007/0282914 A1 | 12/2007 | Sivapragasam et al. | |
| 2008/0010133 A1 | 1/2008 | Pyhalammi et al. | |
| 2008/0034309 A1* | 2/2008 | Louch et al. | 715/766 |
| 2008/0092057 A1 | 4/2008 | Monson et al. | |
| 2008/0192714 A1 | 8/2008 | Kim et al. | |
| 2008/0214172 A1 | 9/2008 | Anwer | |
| 2008/0276182 A1 | 11/2008 | Leow | |
| 2008/0305775 A1 | 12/2008 | Aaltonen et al. | |
| 2008/0319887 A1 | 12/2008 | Pizzi | |
| 2009/0017870 A1 | 1/2009 | An | |
| 2009/0077495 A1 | 3/2009 | Bhat et al. | |
| 2009/0181716 A1 | 7/2009 | Benco et al. | |
| 2009/0186651 A1 | 7/2009 | You | |
| 2009/0228824 A1* | 9/2009 | Forstall et al. | 715/779 |
| 2009/0254753 A1 | 10/2009 | De Atley et al. | |
| 2009/0260004 A1 | 10/2009 | Datta et al. | |
| 2009/0291674 A1 | 11/2009 | Choi | |
| 2009/0307679 A1* | 12/2009 | Lee et al. | 717/168 |
| 2010/0005196 A1 | 1/2010 | Wolff-Petersen | |
| 2010/0030901 A1 | 2/2010 | Hallberg et al. | |
| 2010/0060549 A1* | 3/2010 | Tsern | 345/2.1 |
| 2010/0087175 A1 | 4/2010 | Roundtree | |
| 2010/0115438 A1* | 5/2010 | Chu | 715/764 |
| 2010/0184422 A1 | 7/2010 | Ahrens | |
| 2010/0190478 A1 | 7/2010 | Brewer et al. | |
| 2010/0197219 A1 | 8/2010 | Issa et al. | |
| 2010/0234051 A1 | 9/2010 | Holden et al. | |
| 2010/0281427 A1 | 11/2010 | Ghosh et al. | |
| 2011/0072121 A1 | 3/2011 | Takasugi et al. | |
| 2011/0161149 A1 | 6/2011 | Kaplan | |
| 2011/0210933 A1* | 9/2011 | Forstall | 345/173 |
| 2011/0238496 A1 | 9/2011 | Gurbuxani et al. | |
| 2011/0295980 A1 | 12/2011 | Aldis et al. | |
| 2011/0314389 A1 | 12/2011 | Meredith et al. | |
| 2012/0016735 A1 | 1/2012 | Park et al. | |
| 2012/0102428 A1* | 4/2012 | Stewart | 715/781 |
| 2012/0102547 A1 | 4/2012 | Fransdonk | |
| 2012/0117478 A1 | 5/2012 | Vadde et al. | |
| 2012/0155292 A1* | 6/2012 | Zazula et al. | 370/252 |
| 2013/0097654 A1 | 4/2013 | Aciicmez et al. | |
| 2013/0275915 A1 | 10/2013 | Wang | |
| 2014/0036697 A1 | 2/2014 | Annan et al. | |
| 2014/0047559 A1 | 2/2014 | Vera et al. | |
| 2014/0127662 A1 | 5/2014 | Kron et al. | |
| 2014/0173462 A1 | 6/2014 | Mattingly et al. | |

OTHER PUBLICATIONS

FAIPP Office Action dated May 10, 2012, U.S. Appl. No. 12/876,221, filed Sep. 6, 2010.

Notice of Allowance dated Mar. 30, 2012, U.S. Appl. No. 13/029,103, filed Feb. 16, 2011.

Annan, Brandon C., et al., Patent Application entitled, "Traffic Management of Third Party Applications", filed Jul. 31, 2012, U.S. Appl. No. 13/536,709

Office Action—Restriction Requirement dated Feb. 1, 2012, U.S. Appl. No. 12/876,221, filed Sep. 6, 2010.

Ackerman, Samuel K., "Lecture Slides: Mapping User Interface Design to Culture Dimensions", Aaron Marcus and Associates, Inc., 2001.

Kenja's Newsletter, About Newsletter, http://kenja.net/news.main.html, printed from the World Wide Web, "last modified Fri, Oct. 10, 2003".

Openwave, "Comparison of WAP Push and Short Message Service (SMS)," Openwave Systems, Inc., Redwood City, CA, Apr. 2002.

QUALCOMM, uiOne™, http://brew.qualcomm.com/brew/in/about/uione.html.

Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.

Stanford Technology Ventures Program, "Danger, Inc.: Powering the Next Generation of Mobile Technology", Oct. 15, 2003.

Office Action dated Apr. 15, 2008, U.S. Appl. No. 11/046,083, filed Jan. 28, 2005.

Final Office Action dated Oct. 28, 2008, U.S. Appl. No. 11/046,083, filed Jan. 28, 2005.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Wolter, Eric, Patent Application entitled "Method and System for Calendar-Based Delivery of Themed User-Interface Skins," filed Dec. 9, 2008, U.S. Appl. No. 12/330,759.

Wolter, Eric S., Patent Application entitled "Method and System for Delivery of User-Interface Skins, Applications, and Services to Wireless Devices," filed Jan. 17, 2006, U.S. Appl. No. 11/333,964.

Katzer, Robin Dale, et al., Patent Application entitled "Zone Architecture for Dynamic Targeted Content Creation," filed Oct. 11, 2011, U.S. Appl. No. 13/271,207.

Hollister, Sean, "Apple patent app hints at iPod-based phones, Peel 520 turns shades of green, red, blue and yellow," Engadget, http://

(56) References Cited

OTHER PUBLICATIONS www.engadget.com/2010/09/19/apple-patent-app-hints-at-ipod-based-phones-peel-520-turns-shad/ , Sep. 19, 2010, p. 1.

Delker, Jason R., et al., Patent Application entitled "Provisioning System and Methods for Interfaceless Phone," filed Sep. 6, 2010, U.S. Appl. No. 12/876,220.

Delker, Jason R., et al., Patent Application entitled "System and Method for ID Platform," filed Feb. 8, 2011, U.S. Appl. No. 13/023,486.

Delker, Jason R., et al., Patent Application entitled "Dynamic Loading, Unloading, and Caching of Alternate Complete Interfaces," filed Sep. 6, 2010, U.S. Appl. No. 12/876,221.

Delker, Jason R., et al., Patent Application entitled "Shared ID with Second Party," filed Jan. 31, 2011, U.S. Appl. No. 13/018,083.

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Smith, Nathan A., et al., Patent Application entitled "Restricted Testing Access for Electronic Device," filed Jun. 16, 2011, U.S. Appl. No. 13/161,496.

Delker, Jason R., et al., Patent Application entitled "Ad Sponsored Communication Pack," filed Feb. 18, 2011, U.S. Appl. No. 13/031,123.

FAIPP Pre-Interview Communication dated Jul. 19, 2012, U.S. Appl. No. 13/018,083, filed Jan. 31, 2011.

Cha, Tae-Woo, et al., Patent Application entitled, "Device Experience Adaptation Based on Schedules and Events," filed Jun. 29, 2012, U.S. Appl. No. 13/537,563.

Pre-Interview Communication dated Feb. 26, 2013, U.S. Appl. No. 13/023,486, filed Feb. 8, 2011.

Final Office Action dated Jan. 11, 2013, U.S. Appl. No. 12/876,221, filed Sep. 6, 2010.

Office Action dated Mar. 14, 2013, U.S. Appl. No. 13/161,496, filed Jun. 16, 2011.

Delker, Jason R., et al., Patent Application entitled "Transition Experience During Loading and Updating an Interface and Applications Pack," filed Oct. 24, 2012, U.S. Appl. No. 13/659,889.

Notice of Allowance dated Jun. 4, 2013, U.S. Appl. No. 13/023,486, filed Feb. 8, 2011.

Advisory Action dated Apr. 23, 2013, U.S. Appl. No. 12/876,221 filed Sep. 6, 2010.

Notice of Allowance dated Jul. 2, 2013, U.S. Appl. No. 12/876,221 filed Sep. 6, 2010.

Final Office Action dated May 10, 2013 Application U.S. Appl. No. 13/018,083, filed Jan. 31, 2011.

Notice of Allowance dated Apr. 29, 2013, U.S. Appl. No. 13/537,563, filed Jun. 29, 2012.

Notice of Allowance dated Jun. 27, 2013, U.S. Appl. No. 13/161,496, filed Jun. 16, 2011.

Foreign Communication From a Related Counterpart Application—International Search Report and Written Opinion, PCT/US2013/052805 Oct. 4, 2013.

Advisory Action dated Aug. 6, 2013, U.S. Appl. No. 13/018,083, filed Jan. 31, 2011.

Office Action—Restriction Requirement dated Aug. 26, 2013, U.S. Appl. No. 13/031,123, filed Feb. 8, 2011.

Delker, Jason R., et al., Patent Application entitled "System and Method for ID Platform," filed Sep. 5, 2013, U.S. Appl. No. 14/019,053.

Delker, Jason R., et al., Patent Application entitled "Dynamic Loading, Unloading, and Caching of Alternate Complete Interfaces," filed Sep. 30, 2013, U.S. Appl. No. 14/042,707.

Annan, Brandon C., et al., International Application entitled, "Traffic Management of Third Party Applications", filed Jul. 24, 2013, U.S. Appl. No. PCT/US13/52805.

FAIPP Office Action dated Jan. 24, 2014, U.S. Appl. No. 12/876,220, filed Sep. 6, 2010.

Office Action dated Dec. 26, 2013, U.S. Appl. No. 13/018,083, filed Jan. 31, 2011.

Office Action dated Dec. 17, 2013, U.S. Appl. No. 13/031,123, filed Feb. 18, 2011.

Final Office Action dated Mar. 20, 2014, U.S. Appl. No. 12/876,220, filed Sep. 6, 2010.

Notice of Allowance dated May 6, 2014, U.S. Appl. No. 12/876,220, filed Sep. 6, 2010.

Pre-Interview Communication dated Mar. 28, 2014, U.S. Appl. No. 14/019,053 filed Sep. 5, 2013.

Final Office Action dated Apr. 3, 2014, U.S. Appl. No. 13/018,083, filed Jan. 31, 2011.

Advisory Action dated Jun. 9, 2014, U.S. Appl. No. 13/018,083, filed Jan. 31, 2011.

Pre-Interview Communication dated Jun. 9, 2014, U.S. Appl. No. 13/271,207, filed Oct. 11, 2011.

Pre-Interview Communication dated Mar. 21, 2014, U.S. Appl. No. 13/537,610, filed Jun. 29, 2012.

Notice of Allowance dated May 18, 2014, U.S. Appl. No. 13/537,610, filed Jun. 29, 2012.

Wick, Ryan A., et al., Patent Application entitled "Mobile Phone Controls Preprocessor" filed Jun. 29, 2012, U.S. Appl. No. 13/537,610.

Notice of Allowance dated Aug. 13, 2014, U.S. Appl. No. 14/019,053, filed Sep. 5, 2013.

Office Action dated Sep. 23, 2014, U.S. Appl. No. 13/018,083, filed on Jan. 31, 2011.

Pre-Interview Communication dated Aug. 6, 2014, U.S. Appl. No. 13/045,292, filed Mar. 10, 2011.

First Action Interview Office Action dated Oct. 10, 2014, U.S. Appl. No. 13/045,292, filed Mar. 10, 2011.

Pre-Interview Communication dated Aug. 8, 2014, U.S. Appl. No. 13/659,889, filed Oct. 24, 2012.

First Action Interview dated Oct. 15, 2014, U.S. Appl. No. 13/659,889, filed Oct. 24, 2012.

Office Action dated Oct. 10, 2014, U.S. Appl. No. 13/031,123, filed on Feb. 18, 2011.

Wick, Ryan A., et al., Patent Application entitled "Mobile Phone Controls Preprocessor" filed on Sep. 3, 2014, U.S. Appl. No. 14/476,339.

\* cited by examiner

EXTENDING AN INTERFACE PACK TO A COMPUTER SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An effective user interface for a mobile device may be readily understood and provide the user a sense of comfort and control. Users may see the range of their choices, understand how to accomplish their objectives, and complete their tasks. Work done by the device may be continuously saved, with a full option for the user to undo any activity at any time. A well designed user interface may feature applications and services that perform an increased quantity of work, while requiring a reduced quantity of input from the user. Interface applications may attempt to anticipate the wants and needs of the user. The user may be relieved of tasks comprising searching for or gathering information or locating tools. A well designed interface may deliver the information and tools needed for each step of the process to the user. The interface and its applications may speak the users' language, with familiar phrases and words, instead of terms oriented to the system of the device or complicated technology details. Information presented by the interface appears in a natural and logical order.

SUMMARY

In an embodiment, a method of extending an ID to a computer system comprises detecting, by a mobile communication device operating an ID, a computer system, wherein the IDs comprise an auto-installation routine and at least one of an application, a media file, and a widget; establishing a communication link between the mobile communication device and the computer system; and loading and activating the ID on the computer system.

In an embodiment, a method of extending an ID to a computer system comprises detecting, by a mobile communication device operating an ID, a computer system, wherein the IDs comprise an auto-installation routine and at least one of an application, a media file, and a widget; establishing a communication link between the mobile communication device and the computer system; sending an output of the mobile communication device to the computer system using the communication link for display on an output device of the mobile communication device; and receiving, by the mobile communication device, an input to the ID resulting from an input to the computer system.

In an embodiment, a system for extending an ID to a computer system comprises a mobile communication device in communication with a network, wherein the mobile communication device comprises an ID, and wherein the IDs comprise an auto-installation routine and at least one of an application, a media file, and a widget; a computer system in communication with the mobile communication device over one or more wireless links and in communication with the network through a communication interface; and a provider server in communication with the mobile communication device and the communication interface through the network; wherein the computer system is configured to receive and display at least a portion of the ID from the mobile communication device or the provider server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and methods of sharing an ID with a computer system in the vicinity of a mobile communication device. In general, an ID comprises an auto-installation routine and at least one of: an application, a media file, and a widget, as described in more detail below. A user may be able to access many electronic devices for running programs and accessing a network and the web. Users may only wish to use one device at a time and may choose the option with the fastest access speed and/or highest output resolution, for example the highest display screen resolution. Users of mobile communication devices may therefore suspend the use of their mobile communication devices when devices with faster connection speeds and better output resolutions are present. For example, a user may choose to use a desktop computer for productivity or internet browsing rather than a mobile communication device when both are present.

In order to allow a user to continuously access an ID when in the presence of multiple electronic devices, the system and methods disclosed herein allow an ID on a mobile communication device to be shared with a computer system. Upon entering the proximity of a computer system, a mobile communication device may establish a communication link with the computer system. The mobile communication device may use the link to operate and/or display the ID on the computer system. A user may then use the ID along with other programs operating on the computer system without the need to directly interface with the ID on the mobile communication device. When the user decides to leave the proximity of the computer system, the ID may be transferred back, updated, and/or resumed on the mobile communication device, as described in more detail below, allowing a user to continuously interface and/or operate an ID across multiple systems.

Figure 1:
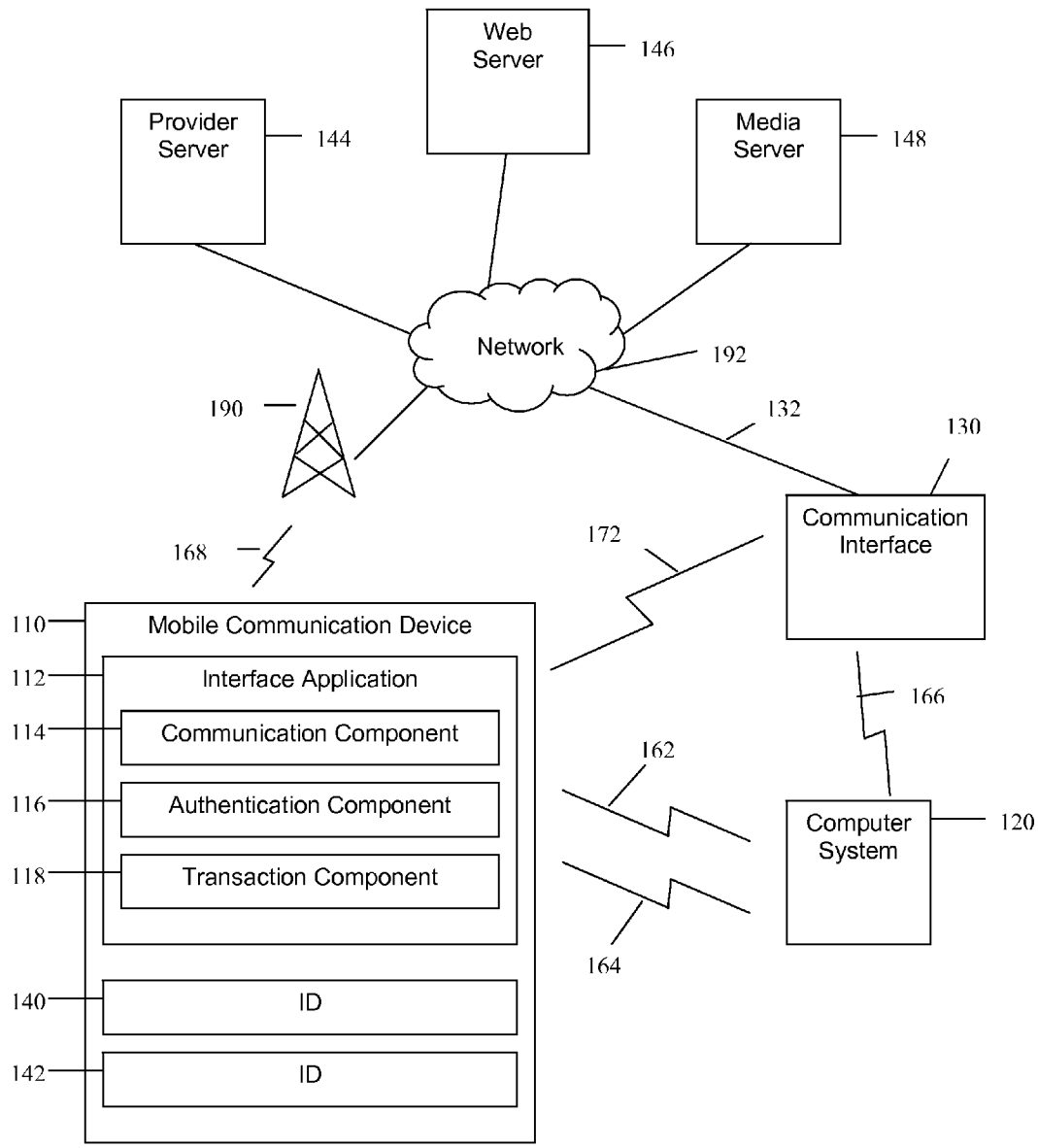
FIG. 1 is a block diagram of a system according to an embodiment of the disclosure.

Turning now to FIG. 1, an embodiment of a system 100 of extending an ID to a computer is provided. The system 100 comprises a mobile communication device 110, a computer system 120, a communication interface 130, a base transceiver station 190, a network 192, a provider server 144, a web server 146, and a media server 148.

The mobile communication device 110 may be one of a mobile telephone, a media player, and a personal digital assistant (PDA). In addition to having a radio transceiver to exchange transmissions with the base transceiver station 190 for wireless voice and data communications, the mobile communication device 110 also may contain hardware and software providing WiFi functionality and/or BLUETOOTH functionality that may be used in connection with the mobile communication device 110 sharing an ID 140, 142 and/or content as described herein. The mobile communication device 110, alternatively or in addition to WiFi technology, may contain other hardware and software associated with other wireless local area network technologies that may observe the IEEE (Institute of Electrical and Electronics Engineers) 802.11 set of standards. The mobile communication device 110 is further described below.

One or more IDs 140, 142 may be loaded on the mobile communication device 110. As used herein, an ID 140, 142 comprises an auto-installation routine or application and at least one of: an application, a network service, a wallpaper, a media file, a widget, a screensaver, a ringtone, and any combination thereof which may be used to provide a custom look and functionality to a mobile communication device 110. Further, an ID 140, 142 comprises an auto-installation routine or application that automatically manages downloading the several components of the ID 140, 142 onto the mobile communication device 110 and making some configuration settings on the mobile communication device 110, thereby saving the user having to go to a plurality of different locations and download the several components of the ID 140, 142 in a series of distinct transactions. In an embodiment, the auto-installation routine or application may include, exclusively or in part, instructions on configuration of the mobile communication device's appearance such as the home screen. For example, the auto-installation routine may comprise configuration instructions for the shortcuts, bookmarks, and placement of widgets on an output component of the mobile communication device 110. As used herein, widgets are small specialized graphical user interface (GUI) applications that provide some visual information and easy access to frequently used functions such as clocks, calendars, new aggregators, and/or internet web sites. Web widgets may be hypertext markup language (HTML) packages of code that may use really simple syndication (RSS) and other technologies to elevate the data experience to the icon on the display of the mobile communication device 110. Examples of web widgets comprise the reporting of a score of a currently ongoing sporting event or the reporting of stock market prices. The ID may also comprise tiles, media players, and listings of links.

While some of these items, for example wallpapers and/or media files, may not be applications, the term ID is meant herein to comprise applications and other software items that, when taken together, can range from a display of data to a full user interface. IDs and methods for loading and provisioning IDs are described in more detail in copending U.S. patent application Ser. No. 12/876,221 by Delker et al. entitled "Dynamic Loading, Unloading, and Caching of Alternate Complete Interfaces" filed on Sep. 6, 2010, and U.S. patent application Ser. No. 12/876,220 by Delker et al. entitled "Provisioning System and Methods for Interfaceless Phone" filed on Sep. 6, 2010, both of which are incorporated by reference herein in their entirety. While only two ID components 140, 142 are shown, it is to be understood that a plurality of IDs could be implemented based on the teachings of the present disclosure. While the remaining disclosure discusses one ID 140, it is to be understood that any other IDs may be equivalent to the ID 140.

U.S. patent application Ser. No. 12/876,221 by Delker et al. entitled "Dynamic Loading, Unloading, and Caching of Alternate Complete Interfaces" filed on Sep. 6, 2010 incorporated by reference in its entirety above defines an interface pack similarly to an ID. In particular, U.S. patent application Ser. No. 12/876,221 states that the user applications, content, and other software provided in the interface pack may comprise web widgets, tiles, really simple syndication (RSS) feed icons, media players, wallpapers, themes, ring tones, call tones, and listings of internet links that together comprise a full user interface for the device. Installable software components that may access a plurality of network services also may be included. The user applications may be automatically loaded without user intervention by a software installer included in the interface pack using loading routines that have been tested and approved along with the user applications by the telecommunications service provider.

The ID 140 may communicate data and/or content through the viewing area of the mobile communication device 110, for example a display screen. The ID 140 may also comprise applications that are executing but are "in the background" and not visible to the user of the mobile communication device 110. The ID 140 may include software items that access services across the network 192, for example network services applications. In order to access services across the network 192, the software items may periodically generate transmissions to external providers of services and request information, messages, news, or other items that may be periodically refreshed by the external provider. Network services may also comprise receiving and displaying regular messages or announcements from external sources. Loading of the ID 140 may comprise loading software components on the mobile communication device 110 that access services across the network 192.

The ID 140 may be specific to the business interests and operations of one or more of the service providers. The applications, media files, and widgets making up an ID 140 may have been tested and/or precertified by a service provider to work with the mobile communication device 110. The telecommunications service provider may also precertify the software routines written to promote automated loading of the ID 140 on the mobile communication device 110, and the software routines written to promote automated sharing of the ID 140 with the computer system 120 may be precertified by the telecommunications service provider.

The interface application 112 executes on the mobile communication device 110 and may contain the components necessary to load, activate, and/or run one or more IDs 140, 142 and/or send/receive data over various communication means.

When loaded on the mobile communication device 110 and brought within proximity of the computer system 120, an ID 140 can be activated by the interface application 112 to enable the sharing of data and/or content between the mobile communication device 110 and the computer system 120.

The interface application 112 may comprise a communication component 114 that may interact with the computer system 120, the communication interface 130, the network 192, and one or more servers 144, 146, 148. The communication component 114 may manage the communications using any of a number of communication methods operable on the mobile communication device 110. The communication component 114 may use the components of the mobile communication device 110 to provide a communication using various communication media, such as air, space, or some other wireless transport media—including combinations thereof. The communication component may use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), BLUETOOTH, or some other communication format—including combinations, improvements, or variations thereof.

The communication signals and/or pathways established by the communications component 114 with other device such as the computer system 120, the network 192, and/or the communication interface 130 may comprise many different signals sharing the same link. The signals and/or pathways may include multiple signals operating in a single "airpath" comprising beacon signals, user communications, communication sessions, overhead communications, frequencies, timeslots, transportation ports, logical transportation links, network sockets, packets, or communication directions. For example, communications between the mobile communication device 110 and the computer system 120 could share the same representative link 162, but be transferred over different communication sessions, frequencies, timeslots, packets, ports, sockets, logical transport links, or in different directions—including combinations thereof.

The communication component 114 may also be capable of detecting and/or discovering one or more wireless communication signals being generated by another device and may initiate a communication protocol to establish a communications connection with the other device. For example, the communication component 114 may detect a wireless communication signal such as a WiFi or BLUETOOTH signal from the computer system 120 and initiate a communication session with the computer system 120 using the WiFi or BLUETOOTH technology, as described in more detail below. In an embodiment, the communication component may establish a connection with another device using one technology while transmitting data using another technology. For example, the communication component 114 may allow the mobile communication device 110 to detect and establish a connection with the computer system 120 using BLUETOOTH and/or a Digital Living Network Alliance (DLNA) standard and subsequently exchange data with the computer system 120 using a WiFi connection.

The interface application 112 may comprise an authentication component 116. The authentication component 116 may interact with the communications component 114 to provide a token, key, or other authentication element to provide a verification of the identity of the mobile communication device 110 and/or the computer system 120 when communicating with one or more of the provider server 144, the web server 146, and the media server 148. The token, key, or other authentication element may vary based on the type of authentication used to verify the identity of the device or devices communicating with the network and/or servers 144, 146, 148. Authentication may include any standard or custom authentication methods applicable to the actual transport protocols. The authentication component may perform the encryption and/or decryption of the various authentication messages passed between the components of system 100.

The interface application 112 may also comprise a transaction component 118 that may promote the mobile communication device 110 interacting with the servers 144, 146, 148 and other components during sessions wherein ID 140 is in use on the mobile communication device 110. When the mobile communication device 110 is engaged in a session with a server using the ID 140, the transaction component 118 may be used to transact business with the server and/or the sponsor of one or more of the servers 144, 146, 148, for example accessing an electronic wallet application on the mobile communication device 110 to complete a point of sale transaction. The transaction component 118 also may receive and display electronic coupons or other items of value provided by one or more providers.

Communication interface 130 may include communications equipment capable of communicating with the mobile communication device 110, the computer system 120, and/or the network 192 using a suitable wired and/or wireless connection (e.g., a WiFi connection). Examples of communication interface 130 can include wireless access points, internet routers, network gateways, as well as other type of communication equipment, and any combinations thereof. The communication interface is connected to the network 192 through connection 132. The communication interface may be configured to send and receive data through link 132 and the network 192 to one or more destinations including servers such as the provider server 144, the web server 146, and/or the media server 148.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

The computer system 120 may comprise any suitable computer system. In general, the computer system 120 may comprise a processor, one or more storage devices, input/output devices, and a network connectivity device. In an embodiment, the computer system 120 may include, but is not limited to, a server computer, a desktop computer, a laptop computer, a personal internet viewer, or any other suitable computer system. Suitable computer systems are described in more detail herein. In an embodiment, the computer system 120 may comprise two or more computers. For example, in an embodiment, the computer system 120 referred to herein may comprise a desktop computer or laptop computer logged in to or invoking functions on a server computer.

The system 100 may comprise one or more of a provider server 144, a web server 146, and/or a media server 148.

While only three servers have been illustrated for clarity, it is understood that any number of servers and/or databases may be coupled with the network 192 and accessible to the mobile communication device 110, the computer system 120, and/or the communication interface 130. In an embodiment, the telecommunications service provider may be associated with the provider server 144 and may be associated with one or more of the web server 146 and the media server 148. In an embodiment, the web server 146 and/or the media server 148 may be associated with entities separate from the telecommunications service provider. The provider server 144 may provide one or more of the IDs 140, 142 loaded on the mobile communication device 110. The provider server 144 may also interact with the authentication component 116 to verify identities and pass tokens, keys, and/or authentication messages between the mobile communication device 110, the computer system 120, and/or the communication interface 130.

The web server 146 and/or the media server 148 may provide one or more of the components of an ID 140 such as an application, media file, web widget, tile, media player, and listing of links. In an embodiment in which the ID 140 accesses service across the network 192, the provider server 144, web server 146, and/or the media server 148 may provide the services and/or content to the ID 140. For example, the provider server 144, the web server 146, and/or the media server 148 may provide messages or announcements to the ID 140 loaded on the mobile communication device 110 and loaded and/or displayed on the computer system 120. In an embodiment, any content and/or data from the web server 146, the media server 148, and any other server may pass through the provider server 144 before passing to the mobile communication device 110, the computer system 120, and/or the communication interface 130.

As shown in FIG. 1, the components of system 100 may communicate through one or more links 132, 162, 164, 166, 168, and 172. Links 132, 162, 164, 166, 168, 172 may use various communication media, such as air, space, metal, optical fiber, other signal propagation paths, and any combinations thereof. Links may be wired or wireless and use various communication protocols such as Internet, Internet protocol (IP), local-area network (LAN), optical networking, hybrid fiber coax (HFC), telephony, T1, other communication formats, and any combinations or variations thereof. In an embodiment, the links 162, 164, 168 between the mobile communication device 110 and the base transceiver station 190, and the mobile communication device 110 and the computer system 120 may be wireless links. Links may be direct links or might include various equipment, intermediate components, systems, and networks. Links could include multiple signals operating in a single pathway.

The ID 140 may be extended from the mobile communication device 110 to the computer system 120 when the mobile communication device 110 becomes proximate to the computer system 120, when an input is activated on the mobile communication device 110, and/or upon another event. Upon one of such occurrences, the mobile communication device 110 may establish a link 162, exchange transmissions with the computer system 120, and cause an ID 140 to be implemented, emulated, and/or an output of the ID 140 displayed on an output device of the computer system 120. The mobile communication device 110 may establish a link with the computer system 120 using any of the communication technologies disclosed herein. For example, the mobile communication device 110 may detect and/or establish a BLUETOOTH link with the computer system 120.

Upon establishing a link 162 based on one of the occurrences, the authentication component 116 on the mobile communication device 110 may perform various authentication routines to verify the identity of the computer system 120, the communication interface 130, and/or the mobile communication device 110 to one or more of the servers 144, 146, 148. In an embodiment, the mobile communication device 110 may then establish a second communication link 164, 172 with the computer system 120 directly and/or through the communication interface 130. For example, the mobile communication device 110 may establish a WiFi connection with the computer system 120 in order to communication data about the ID 140 and/or content with the computer system 120 at a faster rate than the BLUETOOTH connection.

In an embodiment, the mobile communication device 110 may initiate a communication session with the computer system 120 and cause the computer system 120 to load and/or activate the ID 140 currently running on the mobile communication device 110 or an extended version of the ID 140 currently running on the mobile communication device 110. An emulator may be used to create an operating environment on the computer system 120 that simulates the operating environment of the mobile communication device 110. In this embodiment, the ID 140 may be loaded and activated on the computer system 120 in the same or similar manner as the ID 140 would be loaded and activated on the mobile communication device 110. The data and/or content being used by the ID 140 running on the mobile communication device 110 may be transmitted to the computer system 120 using one or more links 162, 164 established between the mobile communication device 110 and the computer system 120. The ID 140 running on the computer system 120 may then load the data and/or content from the mobile communication device 110 to continue operating the ID 140 on the computer system 120. In an embodiment, the data and/or content may be loaded upon activating the ID 140 on the computer system 120 and subsequently downloaded via the network 192.

In an embodiment, an extended version of the ID 140 may be loaded on the computer system 120 and may comprise an ID with additional functionality and/or content configured to use the communication bandwidth and processing power available on the computer system 120. For example, a multimedia ID 140 on the mobile communication device 110 that displays one or more video files may display the multimedia content in a higher resolution and/or at a higher frame rate when the extended version of the multimedia ID 140 is loaded and running on the computer system 120. The extended ID may be configured to use the operating system and components resident on the computer system 120 to operate.

In still another embodiment, the mobile communication device 110 may send one or more outputs of an ID 140 to the computer system 120 to be displayed on an output device. In this embodiment, the computer system 120 may act as an input/output interface for the mobile communication device 110 and may not load the ID 140 or any components associated with the ID 140. In an embodiment, a web browser on the computer system 120 may be used to interface with the mobile communication device 110 and provide a display of the ID 140 on the mobile communication device 110.

The computer system 120 may be configured to provide data to the mobile communication device 110 representative of inputs to the ID 140 displayed on an output device of the computer system 120. For example, the mobile communication device 110 may send only graphical information for display in a web browser on the computer system 120, giving the appearance that the ID 140 is running on the computer system 120. A user may use the input devices (e.g., a keyboard, mouse, etc) on the computer system 120 to provide one or more inputs to the ID 140 displayed on the computer system 120 output device. Since the ID 140 is only being displayed on the computer system 120, the inputs from the computer system 120 input device may be communicated back to the mobile communication device 110, which may be configured to interpret the data as inputs to the active ID 140. In this way, the ID 140 may be operated by a user from the computer system 120 while being run by the mobile communication device 110.

Figure 2:
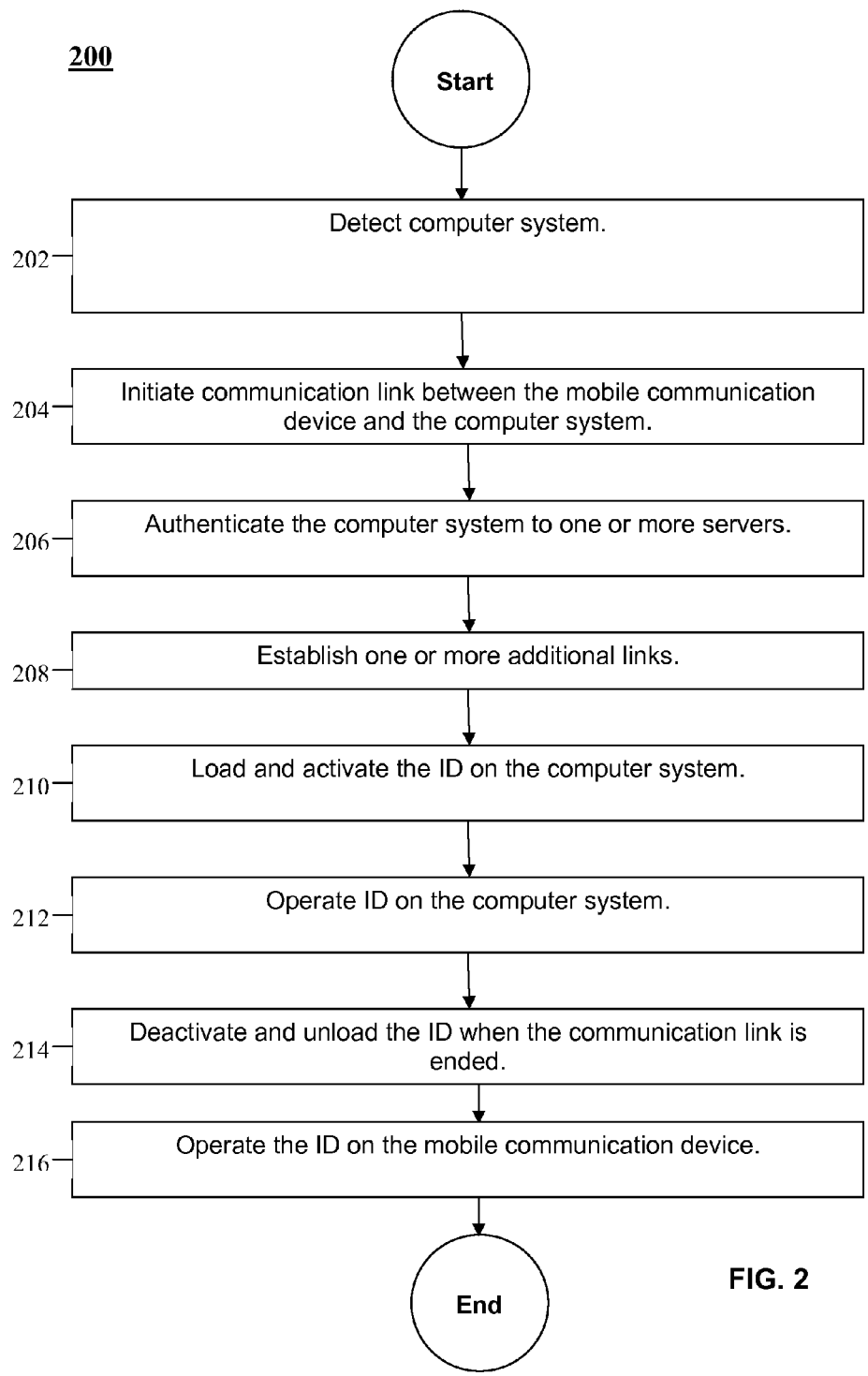
FIG. 2 is a flow chart illustrating a method according to an embodiment of the disclosure.

The system 100 may be used to share an ID 140 from a mobile communication device 110 with a computer system 120. In the method 200 shown in FIG. 2, the mobile communication device 110 may detect a computer system 120 in block 202. In an embodiment, the mobile communication device 110 may automatically detect the computer system 120 or may search for a computer system 120 based on an input from the user of the mobile communication device 110.

The mobile communication device 110 may initiate a communication link 162 with the computer system 120 in block 204. The mobile communication device 110 may use any of the communication technologies disclosed herein to establish a link 162 with the computer system 120. In an embodiment, the mobile communication device 110 establishes a BLUETOOTH connection with the computer system 120 in range of the mobile communication device 110.

In block 206, the mobile communication device 110 may optionally authenticate the computer system 120 to one or more servers such as the provider server 144, the web server 146, and/or the media server 148. The mobile communication device 110 may authenticate the computer system 120 using any suitable means. In an embodiment, the mobile communication device 110 may pass one or more tokens and/or keys from one or more of the provider server 144, the web server 146, and the media server 148 to the computer system 120 through the link 162 established with the computer system 120. The computer system 120 may then use the one or more tokens and/or keys to authenticate a communication session with the servers 144, 146, and/or 148 through the communication interface 130 and the network 192.

In an embodiment, the authentication may proceed in the opposite direction with the computer system 120 obtaining one or more tokens and/or keys from one or more of the servers 144, 146, and/or 148, and passing the tokens and/or keys to the servers 144, 146, and/or 148 through the mobile communication device 110 to authenticate the connection. The authentication process may periodically refresh with new tokens and/or keys in order to continually maintain an authentication of the computer system 120. The authentication process may serve to share some or all the permissions available to the mobile communication device 110 with the computer system 120 during the time the mobile communication device 110 has a link with the computer system 120.

Continuing with the method 200, an additional link 164 may optionally be established between the mobile communication device 110 and the computer system 120 in block 208. In an embodiment, an additional communication link 164 may serve to provide a higher speed data connection between the mobile communication device 110 and the computer system 120. For example, a BLUETOOTH connection may be used to initially link and authenticate the computer system 120 and a WiFi connection may be established to transmit data during the main communication session between the mobile communication device 110 and the computer system 120.

In block 210, the computer system 120 may load and activate the ID 140 currently activated on the mobile communication device 110. The ID 140 may be loaded on the computer system 120 and run using one or more programs or program components resident on the computer system 120, or an emulator may be loaded along with the ID 140 to allow the ID 140 to operate in the same operating system environment as the mobile communication device 110. In an embodiment, an extended version of the ID 140 may be loaded and activated on the computer system 120 as described above. The ID 140 may be loaded from one or more servers 144, 146, 148 through the communication interface 130 and the network 192. In an embodiment, the authentication of the computer system 120 may allow the computer system 120 to download the ID 140 from the server hosting the ID 140. In an embodiment, the computer system 120 may obtain the ID 140, an extended ID, and/or an emulator from the mobile communication device 110 through one or more of the links 162, 164, 166, 172.

The computer system 120 may also load any data used by the ID 140 from the provider server 144, the web server 146, and/or the media server 148. The data associated with the ID 140 may be provided by the provider server 144 if a user profile is maintained by the provider server 144, or the mobile communication device 110. In an embodiment, the mobile communication device 110 may provide the data and/or content associated with the currently activated ID 140 to the computer system 120 using links 162, 164 in the form of the actual data and content and/or links to the appropriate data and content accessible to the computer system 120 over the network 192. For example, the mobile communication device 110 may provide a file with a list of web addresses to direct the ID 140 running on the computer system 120 to the appropriate data and content operating with the ID 140 on the mobile communication device 110. The ID 140 running on the computer system 120 may then represent and/or be the same as the ID 140 operating on the mobile communication device 110.

Continuing with the method 200, the user may operate and interact with the ID 140 running on the computer system 120 in block 212. The ID 140 may generate data, content, and/or communications over the network 192. The data and/or content may be transmitted to one or more of the servers 144, 146, 148 over the network 192 and stored in a list that is accessible to the mobile communication device 110. In an embodiment, the data and/or content may be transmitted through one or more of the links 162, 164 to the mobile communication device 110. The data generated by the ID 140 running on the computer system 120 may be equivalent to the data generated by the mobile communication device 110 running the ID 140. For example, a messaging ID 140 and component of an ID may be used on the computer system 120 and appear to other users to be coming from the mobile communication device 110. In an embodiment, the ID 140 may have functionality to allow the communication route of any requested content and/or data to be obtained through the most efficient connection (e.g., a WiFi connection for video content).

In block 214, the ID 140 may be deactivated and optionally unloaded from the computer system 120 when the communication link 162, 164 between the mobile communication device 110 and the computer system 120 is ended. The link and/or links 162, 164 may be ended in one of several ways. The user of the mobile communication device 110 may end the links when an input is activated on the mobile communication device 110. In another embodiment, the link and/or links 162, 164 may end when the mobile communication device 110 moves out of range of the computer system's 120 communication technologies. For example, when a user has finished using the computer system 120, the user may take the mobile communication device 110 and leave the vicinity of the computer system 120. The computer system 120 may query the mobile communication device 110 at periodic intervals to determine if the mobile communication device 110 is still present. Upon the failure to receive a response to one or more queries, the computer system 120 may assume that the mobile communication device 110 is no longer present. In still another embodiment, the authentication of the computer system 120 may occur periodically. Upon a failure to properly authenticate the computer system 120 during a periodic authentication process, the computer system 120 may assume that the mobile communication device 110 is no longer present.

The ID 140 and associated data and content loaded on the computer system 120 may be deactivated and unloaded when the link is ended. Instead of deleting and later fully reloading the ID 140, portions of the ID 140 may be cached on the computer system 120 for later use. The portions that are cached may be stored locally on the computer system 120. When a mobile communication device 110 running the same ID 140 is brought within proximity of the computer system 120, the computer system 120 may reload the ID 140 from the network or reload a previous ID 140 cached on the computer system 120. This action may involve bringing the saved files out of cache or other storage, accessing current versions of the ID 140 and/or content that were unloaded when the connection with the mobile communication device 110 was ended, and combining the saved portions with the newly generated current versions of the ID 140 and/or content.

In an embodiment, a portion of the ID 140 may be unloaded from the computer system 120. Template files used for rendering ID 140 may be cached. Upon reloading the ID 140, computer system 120 may locate the cached files and download the current portions of the files that may not have been saved because they were associated with perishable content. When combining the cached files with the newly generated current versions of the previously unloaded files, the computer system 120 may follow specialized routines to overcome issues presented by files having different versions. The computer system 120 and or a program loaded along with an ID 140 may determine the routines to combine these files such that the desired current version of the ID 140 may be restored to the computer system 120.

In block 216, the ID 140 may continue running on the mobile communication device 110 with any updated data and/or content generated by the ID 140 running on the computer system 120. The updates to the ID 140 may be stored in a network 192 accessible location, for example in a database associated with the provider server 144. When the mobile communication device 110 detects that the link and/or links 162, 164 with the computer system 120 have ended, the mobile communication device 110 may retrieve the updates from the network 192 accessible location and update the ID 140 accordingly. In another embodiment, the updated data and/or content may be communicated over links 162, 164 to the mobile communication device 110. When the mobile communication device 110 detects that the link or links 162, 164 have ended, the interface application 112 may assume that the ID 140 running on the mobile communication device 110 represents the current state of the ID 140 running on the computer system 120. The ID 140 may then continue to operate on the mobile communication device 110 using the most recently updated ID 140.

Figure 3:
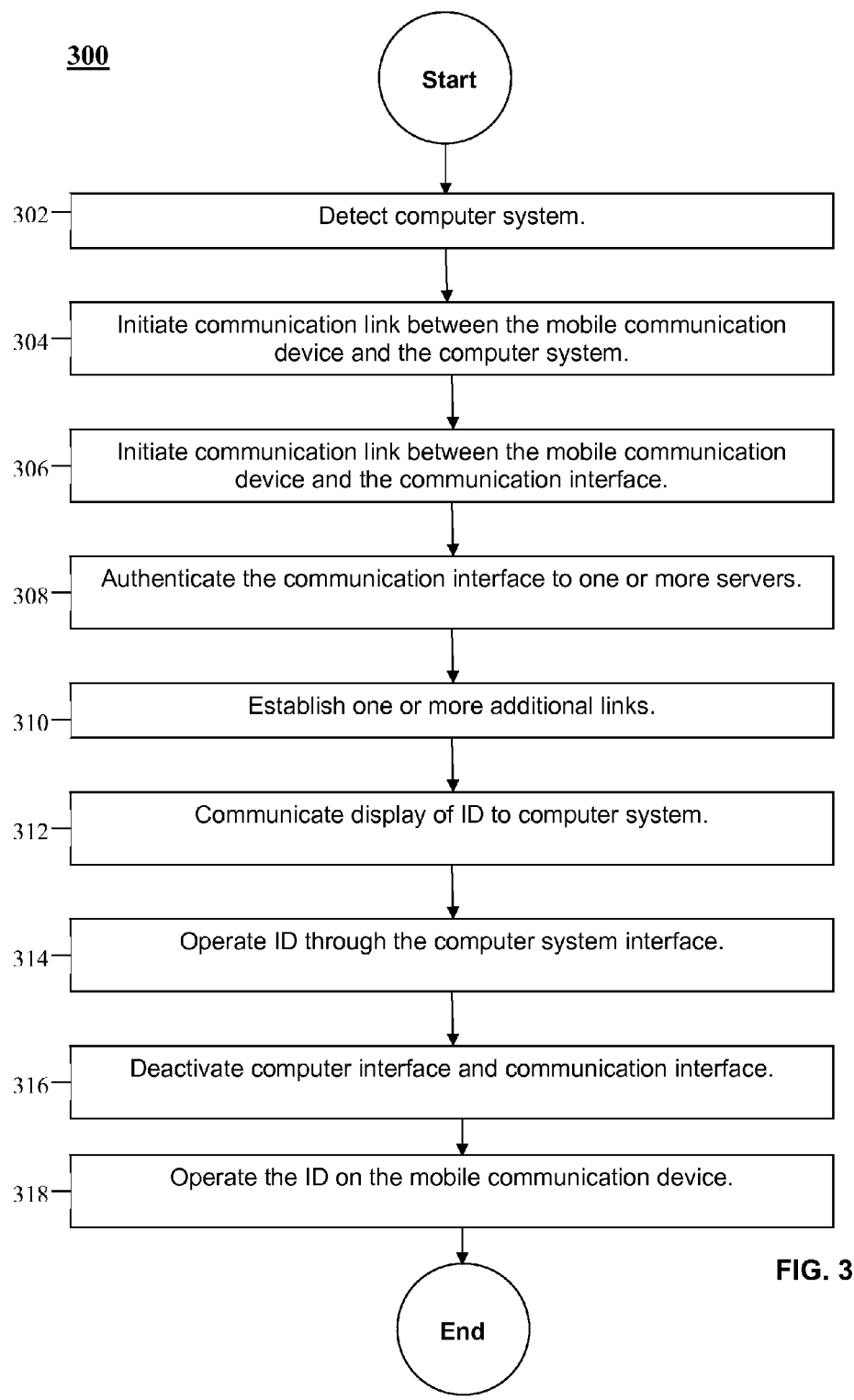
FIG. 3 is a flow chart illustrating a method according to an embodiment of the disclosure.

Turning now to FIG. 3, a method 300 may be used to share an ID 140 with a computer system 120. The mobile communication device 110 may detect a computer system 120 in block 302. The mobile communication device 110 may initiate a communication link 162 with the computer system 120 in block 304. The mobile communication device 110 may optionally initiate another communication link 172 with the communication interface 130 in block 306.

The mobile communication device may optionally authenticate the communication interface 130 to one or more servers such as the provider server 144, the web server 146, and/or the media server 148 in block 308. The mobile communication device 110 may authenticate the communication interface 130 using any suitable means. In an embodiment, the mobile communication device 110 may pass one or more tokens and/or keys from one or more of the provider server 144, the web server 146, and the media server 148 to the communication interface 130 through the link 172. The communication interface 130 may then use the one or more tokens and/or keys to authenticate a communication session with the servers 144, 146, and/or 148 through the network 192. In an embodiment, the authentication may proceed in the opposite direction with the communication interface 130 obtaining one or more tokens and/or keys from one or more of the servers 144, 146, and/or 148, and passing the tokens and/or keys to the servers 144, 146, and/or 148 through the mobile communication device 110 to authenticate the connection.

Continuing with the method 300, an additional link 164 may optionally be established between the mobile communication device 110 and the computer system 120 in block 310. In block 312, the mobile communication device 110 may communicate the display of the ID 140 running on the mobile communication device 110 to the computer system 120 using one or more the links 162, 164. As described in more detail above, the computer system 120 may act as an input/output interface for the mobile communication device 110 and may not load the ID 140 or any components associated with the ID 140. In an embodiment, a web browser or other suitable program on the computer system 120 may be used to interface with the mobile communication device 110 and provide a display of the ID 140 on the mobile communication device 110. The web browser or other interface running on the computer system 120 may be configured to provide one or more inputs to the ID 140 running on the mobile communication device 110.

The ID 140 may be operated through the computer system 120 interface in block 314. The ID 140 may access content and/or data over the network 192 through the mobile communication device 110. In an embodiment, the mobile communication device 110 may access the network 192 and one or more servers 144, 146, 148 through the link 168 with the base transceiver station 190 and the network 192. In another embodiment, the mobile communication device 110 may have a link 172 with the communication interface 130. For example, the mobile communication device 110 may have established a WiFi connection with the communication interface 130. Using link 172, the mobile communication device 110 may be in communication with the network 192 and one or more network accessible servers, such as provider server 144, web server 146, and/or media server 148. The ID 140 may be operated with the same display on both the mobile communication device 110 and the computer system 120. In an embodiment, the ID 140 may operate in the background of the mobile communication device 110 or without displaying an output on the mobile communication device 110 while the computer system 120 interface is being used.

In block 316, the computer system 120 interface may be deactivated when the communication link 162, 164 between the mobile communication device 110 and the computer system 120 is ended. The link and/or links 162, 164 may be ended in one of several ways. The user of the mobile communication device 110 may end the links 162, 164 when an input is activated on the mobile communication device 110. In another embodiment, the link and/or links 162, 164 may end with the mobile communication device 110 moves out of range of the computer system 120 communication technologies. For example, when a user has finished using the computer system 120, the user may take the mobile communication device 110 and leave the vicinity of the computer system 120. The computer system 120 may query the mobile communication device 110 at periodic intervals to determine if the mobile communication device 110 is still present. Upon the failure to receive a response to one or more queries, the computer system 120 may assume that the mobile communication device 110 is no longer present.

In block 318, the ID 140 may be operated on the mobile communication device 110. The ID 140 may continue running on the mobile communication device 110 without any loss of updated content or data since the ID 140 is operating on the mobile communication device 110. Ending the interface with the computer system 120 may only result in a loss of the input/output capabilities of the computer system 120, but may not otherwise affect the ID 140 running on the mobile communication device 110.

The system and methods of the present disclosure may be used in a variety of situations. As an example, a user may operate a mobile communication device 110 with an active ID 140. The active ID 140 may comprise a texting function to allow the user to communicate with the users of other mobile communication devices. Upon entering the user's residence, the user may typically log onto a computer system 120 and temporarily suspend the use of the mobile communication device 110. Using the system and methods described herein, the user may be able to share the active ID 140 with the computer system 120. Upon entering the residence, the user's mobile communication device 110 may detect the presence of the computer system 120 and share the ID 140 and/or the current operating state of the ID 140 with the computer system 120, using any of the methods disclosed herein. The ID 140 that is shared with the computer system 120 may be one of many programs running on the computer system 120. For example, the user may be able to continue to use the texting function while operating additional web browsers, and/or other programs (e.g., a word processor, etc). When the user desires to leave the residence, the user may take the mobile communication device 110, ending the communication with the computer system 120. The ID 140 may then resume operation and/or display on the mobile communication device 110, allowing the user to continuously use the ID 140.

The interface application 120 executes on the portable electronic device 110. Portable electronic devices 110 are described in detail hereinafter. The interface application 120 has contact with a plurality of content servers 170, 180 and downloads interface packs 174, 176, 178, 184, 186, 188 containing user applications 140, 142. When loaded on the portable electronic device 110, the user applications 140, 142 become the user interface or user experience for the portable electronic device 110. Each one of the interface packs 174, 176, 178, 184, 186, 188 provides a complete user interface. For example, one interface pack 174 may provide user applications 140, 142 that comprise the complete user interface. The user interface created by the loaded user applications 140, 142 may be permanent or may be temporary. The user interface created from one of the interface packs 174, 176, 178 from one content server 170 may be replaced by a user interface created from another of the interface packs 174, 176, 178 from the same content server 170. The user interface created from one of the interface packs 174, 176, 178 from one content server 170 may alternatively be replaced by a user interface created from one of the interface packs 184, 186, 188 from a different content server 180 and vice versa.

Complete interfaces for the portable electronic device 110 comprise the full user experience and may comprise user applications 140, 142 that execute in the viewing area of the portable electronic device 110. The complete interface also may comprise user applications 140, 142 that are executing but are "in the background" and not visible to the user. The interface may include software items that are accessing services across networks, for example call tones that may be in effect while a user interface associated with a particular retailer, for example, is loaded and executing. Wallpaper, or the background of a graphical user interface or display, may be part of the user interface. The complete interface also may comprise web widgets and links to internet sites that may constantly or intermittently access internet sites. Ring tones and other sounds that may be downloadable in the interface pack 174 and loadable on the portable electronic device 110 also may be components of the complete interface.

User applications 140, 142 comprise a plurality of application types that together comprise the interface or user experience for the portable electronic device 110. The user applications 140, 142 may comprise web widgets, tiles, really simple syndication (RSS) feed icons, media players, wallpapers, ring tones, and listings of links. While some of these items, for example wallpapers, may not be applications, the term user applications 140, 142 is meant herein to comprise applications and other software items that together comprise the full user interface as described herein. User applications 140, 142 also comprise access to network services that may comprise access to periodically changing content that is changed by providers across networks, for example call tones. Network services also may comprise, for example, the taking delivery of content from a provider across a network and displaying the content in the banner of the portable electronic device 110. Network services also may comprise receiving and displaying regular messages or announcements from external sources. Each interface pack 162, 174, 176, 178, 184, 186, 188 may contain a unique combination of different user applications 140, 142. A single interface pack 162, 174, 176, 178, 184, 186, 188 may comprise a complete user interface. Interface packs 162, 174, 184 may combine, package, or bundle user applications 140, 142 by subject type, motif, or unifying idea. Interface packs 174, 184 provided by the content servers 170, 180 may provide user applications 140, 142 that are directed to the business activities or interests of the content provider, for example an operator of retail stores, associated with the content servers 170, 180.

The present disclosure teaches a system and methods of provisioning an initially interfaceless portable electronic device with a bundle of trusted applications in a streamlined installation process wherein the applications become the user interface for the device. When a newly received portable electronic device, for example a mobile telephone, is first powered on, it may self-activate its account for wireless services with a telecommunications service provider. Upon reboot, a provisioning application taught herein executes on the device and provides the user access to a remote software repository. The repository contains a selection of interface packs, each comprising customized bundles of precertified, trusted applications. The interface pack selected by the user is downloaded to the portable electronic device, uncompressed, and installed by a custom software installer toolset included with the interface pack. The installation takes place automatically without user action. The applications are installed and automatically configured to comprise the interface and user experience for the device.

The user applications 140, 142 and other may comprise a plurality of application types, scripts, and content that together comprise the interface or user experience for the portable electronic device 110. The user applications 140, 142, scripts, and content may comprise web widgets, tiles, really simple syndication (RSS) feed icons, media players, wallpapers, ring tones, and listings of links. The user applications 140, 142 may also comprise software components installed on the portable electronic device 110 that may periodically access some services available from remote sources over networks, including the internet. Such services may comprise taking delivery of content and displaying content in the banner and elsewhere in the portable electronic device 110 and may comprise receiving and displaying regular messages or announcements from external sources. Each interface pack 162, 164, 166 may contain a unique combination of different user applications 140, 142, scripts, and content that, beyond software modules installed on the portable electronic device 110 and available for use at the election of the user, additionally comprise a full user interface, including interactive and regularly refreshed content, some customizable according to the user's tastes and preferences. In an embodiment, the portable electronic device 110 may download more than one interface pack 162, 164, 166 and combine user applications 140, 142, scripts, and content taken from the different interface packs 162, 164, 166. Interface packs 162, 164, 166 may combine, package, or bundle user applications 140, 142, scripts, and content by subject type, motif, or unifying idea. A first user of the portable electronic device 110 may download the interface pack 162 that provides user applications 140, 142, scripts, and content centered around business subjects and productivity tools. A second user of a different portable electronic device 110 may download the interface pack 164 providing user applications 140, 142, scripts, and content involving popular music and contemporary culture. A third user of yet a third portable electronic device 110 may download the third interface pack 166 providing user applications 140, 142, scripts, and content associated with family and homemaking activities. Interface packs 162, 164, 166 may alternatively comprise general user applications 140, 142, scripts, and content that may be appropriate and useful to general user audiences. Each interface pack 162, 164, 166 may contain a style guide that may be used to configure the user applications 140, 142, including positioning of icons associated with the user applications 140, 142 in the display of the portable electronic device 110.

Figure 4:
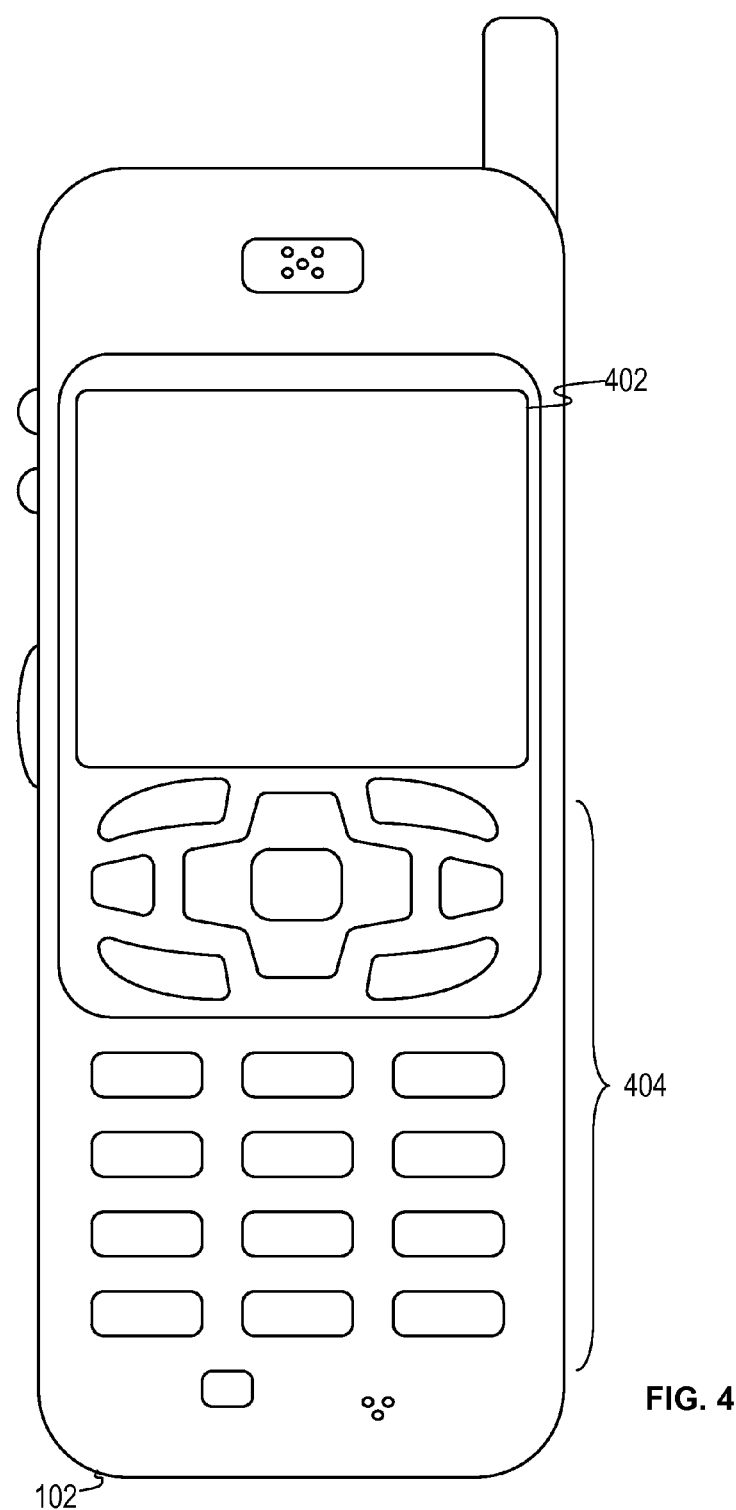
FIG. 4 is an illustration of a mobile device according to an embodiment of the disclosure.

FIG. 4 shows a mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 5:
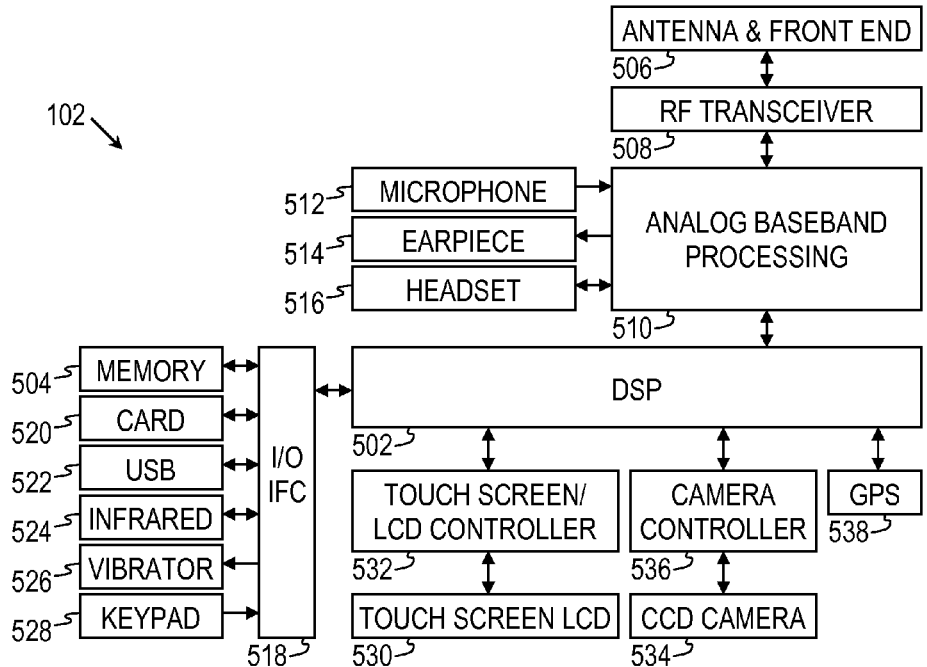
FIG. 5 is a block diagram of a mobile device according to an embodiment of the disclosure.

FIG. 5 shows a block diagram of a mobile communication device 102. In an embodiment, the mobile communication device 110 described herein comprises a mobile communication device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a BLUETOOTH interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
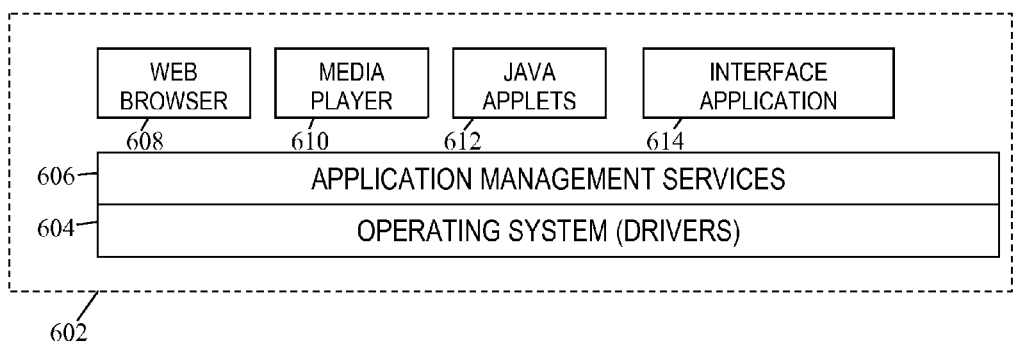
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The interface application 614 may correspond to the interface application 112 provided by the system 100.

Figure 7:
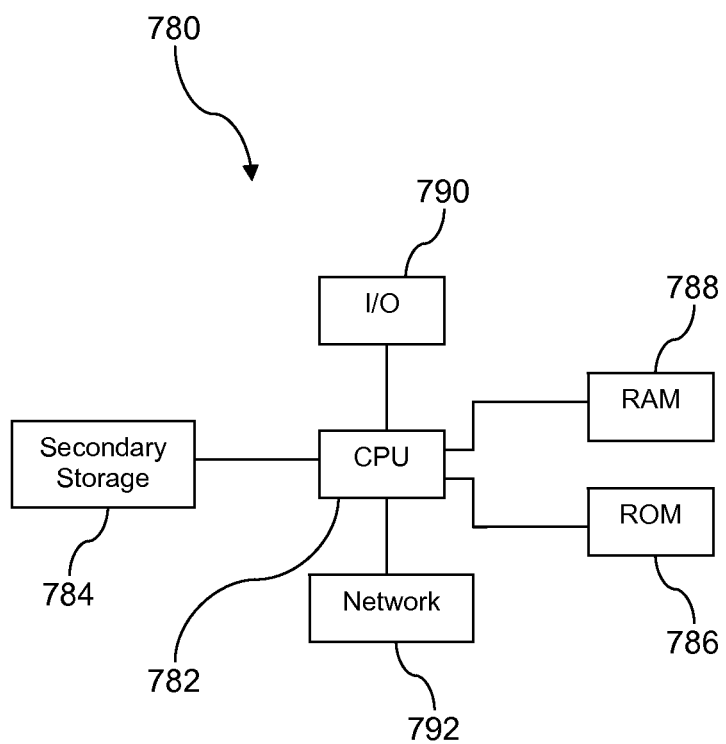
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of extending an interface pack to a computer system comprising:
    operating, by a mobile communication device, an interface pack comprising an auto-installation routine and a unified grouping of software items based on at least one of subject type or motif, which includes two or more of a graphical user interface application, another application, and a media file, wherein the unified grouping of software items, when taken together, establishes a complete user interface;
    detecting, by the mobile communication device operating the interface pack, a computer system;
    establishing a communication link between the mobile communication device and the computer system;
    initially authenticating the computer system by passing one or more tokens through the communication link between at least one server and the computer system via the mobile communication device;
    in response to the initial authentication of the computer system, sending, by the mobile communication device, the interface pack to the computer system over the communication link for loading and activating;
    causing, by the mobile communication device, the computer system to load and activate the interface pack comprising the auto-installation routine and the two or more of the graphical user interface application, the other application, and the media file;
    periodically authenticating the computer system by passing one or more new tokens through the communication link between the at least one server and the computer system via the mobile communication device; and
    deactivating and unloading or deactivating and caching, by the computer system, the interface pack when the communication link is ended, wherein the communication link is ended in response to failing to receive a response to one or more queries from the mobile communication device or in response to failing to properly authenticate the computer system during the periodic authentication.

2. The method of claim 1, wherein the interface pack is provided to the computer system from a network accessible server for loading and activating.

3. The method of claim 1, further comprising establishing a second communication link between the mobile communication device and the computer system, wherein the second communication link has a higher data transfer rate than the communication link.

4. The method of claim 1, wherein the interface pack loaded and activated on the computer system comprises an extended version of the interface pack operating on the mobile communication device.

5. The method of claim 1, further comprising:
    operating the interface pack on the computer system; and
    receiving, by the mobile communication device, updated content or data for the interface pack from the computer system during the operation of the interface pack on the computer system.

6. A method of extending an interface pack to a computer system comprising:
    operating, by a mobile communication device, an interface pack comprising an auto-installation routine and a unified grouping of software items based on at least one of subject type or motif, which includes including two or more of a graphical user interface application, another application, and a media file, wherein the unified grouping of software items, when taken together, establishes a complete user interface;

detecting, by the mobile communication device operating the interface pack, a computer system;

establishing a communication link between the mobile communication device and the computer system;

initially authenticating the computer system by passing one or more tokens through the communication link between at least one server and the computer system via the mobile communication device;

in response to the initial authentication of the computer system, sending, by the mobile communication device, the interface pack to the computer system over the communication link for loading and activating;

causing, by the mobile communication device, the computer system to load and activate the interface pack comprising the auto-installation routine and the two or more of the graphical user interface application, the other application, and the media file;

sending an output of the mobile communication device to the computer system using the communication link for display on an output device of the computer system;

receiving, by the mobile communication device, an input to the interface pack resulting from an input to the computer system;

periodically authenticating the computer system by passing one or more new tokens through the communication link between the at least one server and the computer system via the mobile communication device; and deactivating and unloading or deactivating and caching, by the computer system, the interface pack when the communication link is ended, wherein the communication link is ended in response to failing to receive a response to one or more queries from the mobile communication device or in response to failing to properly authenticate the computer system during the period authentication.

7. The method of claim 6, further comprising:
obtaining content or data from a network during operation of the interface pack on the mobile communication device.

8. The method of claim 6, further comprising establishing a second communication link between the mobile communication device and the computer system, wherein the second communication link has a higher data transfer rate than the communication link.

9. The method of claim 6, further comprising:
operating the interface pack on the computer system; and
receiving, by the mobile communication device, updated content or data for the interface pack from the computer system during the operation of the interface pack on the computer system.

10. The method of claim 7, wherein the content or data is obtained from the network through a wireless communication link between the mobile communication device and the network.

11. The method of claim 7, wherein the content or data is obtained from the network through a communication interface that has access to the network.

12. A system for extending an interface pack to a computer system comprising:
a mobile communication device that comprises an interface pack in communication with a network, wherein the interface pack comprises an auto-installation routine and a unified grouping of software items based on at least one of subject type or motif, which includes including two or more of a graphical user interface application, another application, and a media file, and wherein the unified grouping of software items, when taken together, establishes a complete user interface;

a provider server in communication with the mobile communication device and a communication interface through the network; and the computer system in communication with the mobile communication device over one or more wireless links and in communication with the network through the communication interface, wherein the computer system is initially authenticated by passing one or more tokens through the communication link between the provider server and the computer system via the mobile communication device and the computer system is subsequently periodically authenticated by passing one or more new tokens through the communication link between the provider server and the computer system via the mobile communication device;

wherein the mobile communication device is further configured to:

send the interface pack to the computer system over at least one of the one or more wireless links in response to the initial authentication of the computer system, and cause the computer system to load and activate the interface pack comprising the auto-installation routine and the two or more of the graphical user interface application, the other application, and the media file, wherein the computer system is configured to load at least a portion of the interface pack from the mobile communication device or the provider server, and wherein the computer system is further configured to deactivate and unload or deactivate and cache the interface pack when the at least one of the one or more wireless links is ended, the communication link being ended in response to failing to receive a response to one or more queries from the mobile communication device or in response to failing to properly authenticate the computer system during the periodic authentication.

13. The system of claim 12, wherein the mobile communication device is configured to establish a link using one or more of code division multiple access (CDMA), worldwide interoperability for microwave access (WiMAX), universal mobile telecommunications system (UMTS), long-term evolution (LTE), wireless fidelity (WiFi), global system for mobile communications (GSM), BLUETOOTH, and any combination thereof.

14. The system of claim 12, wherein the mobile communication device comprises an authentication component configured to authenticate one or more of the computer system and the communication interface to the provider server.

15. The system of claim 12, further comprising a web server or a media server, wherein the web server or the media server provides content or data for the interface pack over the network.

16. The system of claim 12, wherein the computer system is further configured to provide an input to the interface pack to the mobile communication device over the one or more wireless links.

17. The system of claim 12, further comprising an emulator configured to create an operating environment on the computer system that simulates the operating environment on the mobile communication device.

* * * * *